Oct. 7, 1969  R. O. DE WEESE ET AL  3,471,626
HOLLOW ELECTRODE CONTROL DEVICE
Filed March 21, 1968  2 Sheets-Sheet 2
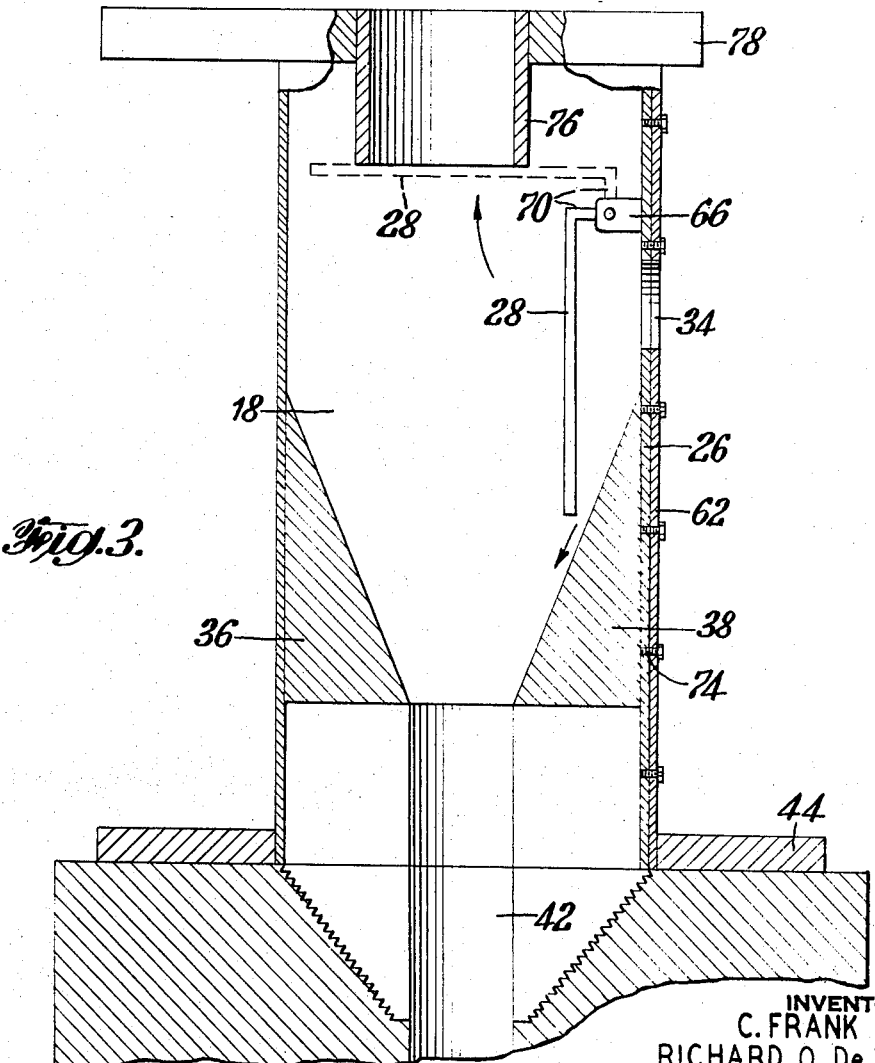
INVENTORS
C. FRANK YOUNG
RICHARD O. De WEESE
BY D. Lawrence Padilla
ATTORNEY

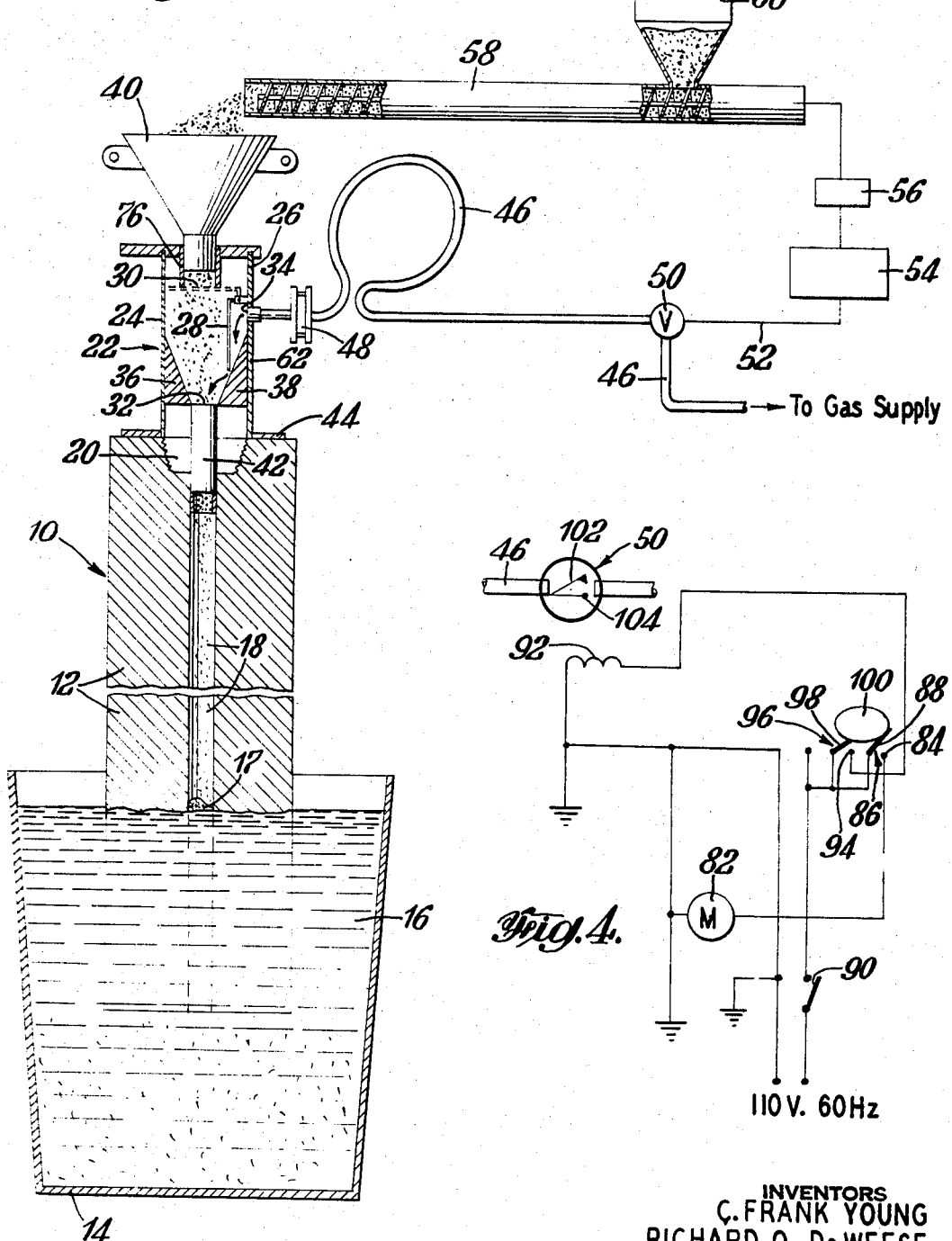

United States Patent Office 3,471,626
Patented Oct. 7, 1969

3,471,626
HOLLOW ELECTRODE CONTROL DEVICE
Richard O. De Weese, North Tonawanda, and C Frank Young, Niagara Falls, N.Y., assignors to Union Carbide Corporation, a corporation of New York
Filed Mar. 21, 1968, Ser. No. 715,085
Int. Cl. H05b 7/08
U.S. Cl. 13—1
12 Claims

ABSTRACT OF THE DISCLOSURE

A control system for use with a hollow electrode to periodically force a non-reactive gas down the shaft of the electrode to clear it of feed material which has accumulated. The system includes a cover assembly with a hingeably mounted plate which is positioned so as to direct the entering gas to the bottom segment of the electrode and further includes regulating means for automatically releasing gas at prescribed intervals.

Field of invention

This invention relates generally to a hollow electrode for use in an arc furnace and more particularly to a control system to ensure continuous operation of the hollow electrode.

Description of prior art

The use of a hollow electrode in an arc furnace during the preparation of large quantities of alloys can be quite advantageous. Not only does the hollow electrode function as the source of the arc which is struck with the metal in the furnace crucible, but it also serves as the feed channel through which the constituent materials are passed. Since the materials are fed through the center of the electrode, they fall into the mix in the immediate region of the arc. Thus quick and efficient intermixing of the materials is effected. Furthermore, the proper quantity of additive can be readily controlled thereby enabling a better alloy to be produced.

Despite these apparent advantages, hollow electrodes have not gained widespread use primarily because of the difficulties associated with maintaining them in continuous operation. For example, since the material is fed down through the center shaft of the electrode, this shaft must be kept free of any buildup of the feed material and subsequent clogging of the shaft. When such an obstruction is formed, the shaft must be cleared, necessitating system shutdown. Clogging of the shaft at the bottom is a frequent occurrence due to freezing of the liquid metal when the cold mix comes in contact with it. Because detection of the obstruction is generally not achieved until a complete blockage is formed, shutdown of the furnace is once again required.

Description of the invention

It will be appreciated therefore, that while a hollow electrode has been recognized as a potential important component in a metallurgical furnace, successful economic exploitation is still lacking. It is the primary object of this invention, therefore, to provide a control system which prevents clogging of a hollow electrode during its operation.

Accordingly, the invention broadly comprises a control device which periodically forces a suitable gas under pressure through the center shaft of the hollow electrode thereby clearing the shaft before clogging of the shaft can occur. The device in its preferable form includes a cover assembly which is positioned over an opening in the end of the electrode. The cover assembly includes a hingeably mounted plate which is blown by the force of the gas entering through a side opening to a position which causes it to direct the path of the gas down the shaft and out of the bottom of the electrode. While the gas is clearing the shaft, feed material is prohibited from entering the shaft. The gas is fed to the shaft from a supply source through a valve which is activated to an open position for only a brief interval during a programmed cycle. In this manner, gas is permitted to enter the electrode shaft at regular intervals and disperse feed particles which may have collected during the previous cycle. A programmer operates to stop the feed mechanism for a second or two before the gas valve is activated.

Description of the drawings

The invention will be more readily understood by referring to the drawings, wherein:

FIGURE 1 is an elevation view, partly in section, of a hollow electrode in an arc furnace together with the control system of the inventiton;

FIGURE 2 is an isometric view of a segment of a cover assembly which is successfully employed with the hollow electrode shown in FIGURE 1;

FIGURE 3 is an enlarged side elevation view of a cover assembly including the segment shown in FIGURE 2; and FIGURE 4 is a schematic diagram of a regulating means which is employed to control the operation of the cover assembly of FIGURE 3.

Referring now to the drawings and especially FIGURE 1, there is illustrated an arc furnace designated generally by the numeral 10. The furnace 10 includes hollow electrodes 12, a furnace crucible 14 and a metal 16 contained within the crucible 14. The electrodes 12 are shown broken away from each other to indicate that a series of electrodes are joined together in the conventional manner. A center shaft 18 is provided in each electrode and when electrodes are joined a feed conduit is formed. As is common to most arc electrodes, a threaded receptacle 20 is placed in the end of the electrode so that it can be readily joined to another electrode. Positioned above the receptacle 20 is a cover assembly 22 comprising a box 24 having a side wall 26 to the inside of which is affixed a movable plate 28. The box 24 is fully enclosed except for openings 30, 32 in the top and bottom portions and orifice 34 in the side wall 26. The box 24 is, in the preferred embodiment, equipped with tapered baffles 36, 38. These baffles are useful to direct the feed material and the gas down the shaft 18 as will hereinafter be further explained. A feed receiving funnel 40 is situated at the top of the box 24 and communicates with the opening 30. An insert pipe 42 is secured to the bottom of the box 24 at the opening 32 and is used to lead the feed material directly to the shaft 18 thus avoiding loss of feed material in the receptacle 20. A base member 44 bridges the receptacle 20 and supports the cover assembly 22. A flexible gas conduit 46 is connected to the side wall 26 at orifice 34 through the insulated flanged joint 48. The conduit is flexible and long enough to enable movement of the system to be effected as the electrodes are consumed during the operation of the furnace.

A valve 50 is positioned in the gas conduit 46 to regulate the flow of gas from a supply source (not shown). Electrical connecting means 52 connects the valve 50 to regulating means 54 which functions to control not only the valve 50 but also drive means 56. A feed mechanism 58 such as the rotating screw mechanism shown is positioned below a hopper 60 which contains the feed material. The feed material is dispensed at the exit end of the mechanism 58 into the top of the receiving funnel 40.

When the system is in operation, the material to be added is fed, in particulate form, from the hopper 60 to the shaft 18 through feed mechanism 58, funnel 40, cover assembly 22 and insert pipe 42. The material is fed at a rate and in a quantity consistent with the demands of the process for the production of the particular alloy involved. The regulating means 54 which provides the driving power to operate the screw mechanism 58, also includes components which cooperate to open the valve 50 for a few seconds approximately once every thirty or sixty seconds. During the period that the valve 50 is open, a suitable gas flows through the conduit 46 and the orifice 34 and forces the plate 28 to rotate to the position shown by the dashed lines i.e. directly across the opening 30 in the box 24. The gas is thereby prevented from flowing up through the funnel 40 and must flow down the shaft 18 to clear any feed material deposits which may have formed toward the bottom of the shaft 18 near the metal 16 such as that shown by the number 17. After a few seconds have elapsed, the regulating means 54 activates the valve 50 to a closed position thus stopping the gas flow and returning plate 28 to its normal position, and reactivates the screw mechanism 58 which has been stopped during the gas purge to again carry the feed material to the shaft 18. The cycle is then automatically repeated.

The plate 28 and auxiliary equipment is more clearly illustrated in FIGURE 2. As there shown, the plate 28 is hingeably mounted to the support frame 62 by means of the bearings 64, 66. A rod 68 is positioned within the bearings and is connected to the plate 28 by means of a cross plate 70. Thus it can be seen that when gas pressure is exerted on the plate 28 it will be forced to move away from the frame 62 in an upward direction, its movement being assisted by the rotation of the rod 68 in the bearings. The rod 68 is preferably extended across the support frame so that it almost contacts the walls of the box 24 in order to effectively center the plate 28. Of course, a hinge member can be placed between the plates 28 and 70 at position 72, thereby eliminating the need for rod 68 and bearings 64, 66. Cross plate 70 could then be welded or otherwise secured directly to the frame 62 and the plate 28 will be forced to rotate about the hinge by the pressure of the incoming gas.

FIGURE 2 illustrates the preferred embodiment in that the plate is secured to a frame which is separable from the box 24. The holes 74 are drilled in the frame so that it can be readily bolted to the side wall 26 of the cover assembly. In this manner, access to the component parts is easily achieved in the event that repair or replacement becomes necessary.

The operation of the cover assembly of the invention can be better understood from the enlarged view shown in FIGURE 3. As illustrated, the plate 28 is normally in a position substantially parallel to the vertical electrode shaft when gas is not flowing. When a surge of gas passes through the opening 34, the plate 28 is forced to a position substantially 90° from the vertical, that is, perpendicular to the longitudinal axis of the electrode. The plate seats upon the tube 76 which can either be a part of the funnel 40 or a separate member depending from a flange 78. In any event, the opening 30 in the tube 76 must be smaller than the plate 28 so that a proper seal can be effected.

One embodiment of the regulating means 54 is illustrated in FIGURE 4. A motor 82, which controls the driving means 56 and thus the feed mechanism 58 in FIGURE 1, is connected to the contact point 84 on switch 86. The contact arm 88 on the same switch 86 is connected to the power supply (not shown) through switch 90. A solenoid coil 92 is electrically connected to the contact point 94 on switch 96. The contact arm 98 is also connected to the power supply switch 90. A revolving cam 100 is positioned adjacent contact arms 88, 98 and is rotated by a motor (not shown).

To operate the circuit, switch 90 is closed and enables a 110 volt, 60 Hertz power supply to be connected to contact arms 88 and 98. The motor operated cam revolves and closes contact arm 88, thereby activating motor 82 to drive the feed mechanism and supply feed material to the electrode shaft. The cam is designed such that for a brief period during revolution, contact arm 98 is forced to connect to contact point 94 and simultaneously, contact arm 88 is released from contact points 84. During this period, the power supply voltage causes current to flow through coil and the electromagnetic force induced thereby draws arm 102 in valve 50 to position 104. In this position the arm 102 no longer blocks the passage of gas through conduit 46. As the cam rotates further, coil 92 is deprived of current as switch 96 again opens. Thus gas flow in conduit 46 is again prevented while at the same time motor 82 once again drives the feed mechanism. The cycle is then repeated.

It will be appreciated that the regulating means shown in FIGURE 4 is one of many possible embodiments and a variety of modifications can be incorporated therein. The function of the device is to periodically release a pulse of gas and preferably to stop the feed mechanism for a brief period prior to and during the release of gas. Thus any system which is designed to perform this function would be equally suitable.

The following example is illustrative of the apparatus of the invention.

Example I

A 12 inch diameter hollow graphite electrode 60 inches in length and having a 2 inch diameter shaft was positioned as shown in FIGURE 1 over a furnace crucible containing ferromanganese slag. A 1¼ inch pipe was placed in the center of the shaft and connected to a cover assembly box which measured 2¾ inches by 3½ inches by 4 inches. Silicon metal particles ¼ by d. were fed to the box by a fed screw mechanism 2 inches in diameter and 50 inches long. The metal was fed at a rate of 141 pounds per hour for approximately 13 hours. A regulating means consisting of the components shown in FIGURE 4 were set to release argon gas at 75 p.s.i. every 30 seconds for a duration of 1 second to clear the electrode shaft. The cover assembly was similar to that shown in FIGURE 3 and included a plate 28 composed of wrought iron measuring 2⅝ inches in length by 2 inches in width. The plate was rigidly secured to a ⅛ inch diameter stainless steel rod by means of a cross plate 1⅜ inches by ¼ inch. The rod was positioned between two bearings which were welded to a support frame. The support frame was also wrought iron measuring 5½ inches long, 4⅛ inches wide, 10 gauge thick, and was secured to the cover box side wall by eight ¼ x ¾ inch diameter brass bolts. The orifice 34 in the cover box side wall was ¾ inch in diameter as was the conduit 46 which was connected to the support frame and communicated directly with the orifice. A tube 2 inches in diameter was made part of the cover box as shown in FIGURE 4. The system functioned substantially continuously during the enitre test period and 82.6% of the total tapped furnace alloy was silicon feed material.

Example II

Same as Example I except silicon was added at a rate of 172 pounds per hour and the system functioned for 8½ hours with no loss of time due to clogging of the shaft.

The pressure of 75 p.s.i. employed in the examples may of course be varied without substantially affecting the operation of the system. The pressure need only be sufficient to maintain the plate of the cover assembly across the opening in the tube at the top of the cover assembly box and to clear the shaft of feed material. Pressures below 75 p.s.i. will also be satisfactory if clogging is not excessive, and greater pressures will of course clear the shaft quite effectively. The thirty second cycle, as well as the one second "on time" for the gas purge can also be varied in accordance with the demands of the system.

The gas can also in some applications be employed to react with the metal in the furnace crucible. For this reason the gas need not be restricted to a non-reactive gas although such a gas would be most frequently employed. Thus methane, carbon dioxide, argon, nitrogen and the like are examples of some useful gases. It is to be noted that whichever gas is used, in addition to the primary function of clearing the shaft, it also causes the feed material to mix quickly and efficiently with the metal in the crucible thus producing a high quality alloy.

It will be appreciated that the cover assembly can be connected to the hollow electrode in a number of ways. For example, it need not be secured directly to or be supported by the electrode but can be mounted on separate supports with an insert pipe communicating directly with the electrode shaft. A hollow threaded fitting can be inserted into the threaded receptacle of the electrode around the insert pipe, permitting sliding movement of the electrode about the fitting while the cover assembly remains stationary. A packing gland could be included between the insert pipe and threaded receptacle if a toxic gas such as chlorine is employed.

What is claimed is:

1. In an electric arc furnace including a crucible having a metal therein and a hollow arc electrode, a control system for preventing blockage of the shaft within said hollow electrode, comprising, in combination,
    (a) a cover assembly positioned adjacent said electrode and in communication with the shaft of said electrode, said assembly including a movable plate secured within said assembly;
    (b) conduit means for carrying a gas, said conduit means being connected to said cover assembly;
    (c) regulating means for passing a gas through said conduit means at predetermined intervals, said gas being under a pressure sufficient to move said plate on said cover assembly to a position such that passage of said gas is directed down said shaft toward said metal whereby blockage of said shaft by materials fed therethrough is prevented.

2. The control system of claim 1 wherein said cover assembly comprises:
    (a) a box member having an opening in the upper and lower surface thereof, said openings being coaxial with said electrode shaft, and having a side wall with an orifice therein;
    (b) a support frame secured to said side wall; and
    (c) means for movably mounting said plate to said support frame.

3. The control system of claim 2 wherein said means for movably mounting said plate comprises:
    (a) a rod rigidly secured to said plate,
    (b) bearing means affixed to said support frame, said rod being connected to said bearing means such that said rod rotates when pressure is applied to said plate.

4. The control system of claim 2 wherein a tube having an opening at each end thereof is positioned in the upper part of said box member in communication with the opening in the upper surface of said box member, said tube terminating adjacent said plate in said cover assembly such that when said plate is moved by said gas flow it contacts said tube and covers one opening therein.

5. The control system of claim 4 wherein an insert pipe is secured to said box assembly and depends therefrom into said electrode shaft to direct the flow of feed material and gas to said shaft.

6. The control system of claim 1 wherein there is provided a feed mechanism communicating with said cover assembly, and means for driving said feed mechanism, said feed mechanism carrying a feed material which is to be added to said metal in said crucible through said shaft in said electrode.

7. The control system of claim 6 wherein said regulating means comprises:
    (a) first and second switching means, said second switching means being connected to said means for driving said feed mechanism;
    (b) a cam member positioned adjacent both of said switching means;
    (c) a valve in said conduit means;
    (d) actuating means for said valve, said actuating means being connected to said first switching means;
    (e) means to move said cam member, whereupon during movement, said cam member closes said second switching means for a major portion of the operation of said control system, said first switching means being open when said second switching means is closed, whereby said feed mechanism is actuated to operate a major portion of the operating time of said control system and said valve is actuated to pass a gas through said conduit a minor portion of said operating time.

8. A cover assembly comprising, in combination:
    (a) a cover box having an opening in the upper and lower surfaces, said openings being substantially coaxial, and having a side wall with an orifice therein;
    (b) a plate positioned within said cover box and adjacent said side wall orifice such that it normally covers said orifice;
    (c) means to movably secure said plate to said side wall; whereupon during the passage of a fluid through said orifice said plate is moved to a position so as to seal said opening in the upper surface of said cover box thereby directing said fluid to exit from said opening in the lower surface of said cover box.

9. The assembly of claim 8 wherein a removable support frame is secured to said side wall and said plate is secured to said support frame.

10. The assembly of claim 9 wherein at least one baffle member is positioned within said cover box proximate said opening in the lower surface of said cover box to facilitate the flow of fluid toward said opening.

11. The assembly of claim 9 wherein a hollow tube is positioned over the opening in the upper surface of said cover box and said plate extends across the opening in said tube when moved by said fluid.

12. The assembly of claim 11 wherein a hollow insert pipe is secured to said cover box in communication with the opening in the lower surface of said cover box to form a conduit for said fluid as it flows through said opening.

References Cited

UNITED STATES PATENTS

| | | | |
|---|---|---|---|
| 2,668,085 | 2/1954 | Baresch | 222—373 X |
| 3,095,018 | 6/1963 | Moreland | 222—373 X |
| 3,255,921 | 6/1966 | Eveson et al. | 222—55 X |
| 3,244,494 | 4/1966 | Apple et al. | 222—55 X |
| 3,370,119 | 2/1968 | Grimm et al. | 13—18 |

BERNARD A. GILHEANY, Primary Examiner

H. B. GILSON, Assistant Examiner

U.S. Cl. X.R.

13—18